(12) United States Patent
O'Connor

(10) Patent No.: US 7,624,249 B2
(45) Date of Patent: Nov. 24, 2009

(54) PROCESSOR MULTI-PARTITION SECURITY ARCHITECTURE

(76) Inventor: Dennis O'Connor, 12130 E. Via De Palmas, Chandler, AZ (US) 85249

( * ) Notice: Subject to any disclaimer, the term of this patent is extended or adjusted under 35 U.S.C. 154(b) by 365 days.

(21) Appl. No.: 11/271,778

(22) Filed: Nov. 10, 2005

(65) Prior Publication Data

US 2007/0106871 A1 May 10, 2007

(51) Int. Cl.
*G06F 12/00* (2006.01)
(52) U.S. Cl. .................................. 711/221; 711/103
(58) Field of Classification Search ................. None
See application file for complete search history.

(56) References Cited

U.S. PATENT DOCUMENTS 7,149,901 B2 * 12/2006 Herbert et al. .............. 713/190
2006/0271919 A1 * 11/2006 Moyer ........................ 717/136

OTHER PUBLICATIONS

"TrustZone Cores—Secure Processor Core Technology" [on-line], Arm Holdings Ltd. plc, [archived on Dec. 13, 2005]. Retrieved from the Internet: <URL: http://web.archive.org/web/20051213013306/http://www.arm.com/products/esd/trustzone_cores.html>, (2005), 1 pg.
"TrustZone System Design—System Hardware Security Control" [on-line], Arm Holdings Ltd. plc, [archived on Dec. 13, 2005]. Retrieved from the Internet: <URL: http://web.archive.org/web/20051213012545/http://www.arm.com/products/esd/trustzone_systemdesign.html, (2005), 3 pgs.
"TrustZone® Security Foundation by ARM®" [on-line], Arm Holdings Ltd. plc, [archived on Dec. 11, 2005]. Retrieved from the Internet: <URL: http://web.archive.org/ web/20051211064714/http://www.arm.com/products/esd/trustzone_home.html>, (2005), 2 pgs.

* cited by examiner

*Primary Examiner*—Brian R Peugh
(74) *Attorney, Agent, or Firm*—Blakely, Sokoloff, Taylor & Zafman LLP

(57) ABSTRACT

A state machine may be coupled to a memory management unit configuration table (MMUCT) stored in a memory to index an entry from the MMUCT. A parameter associated with the entry may be used to control operations associated with a memory management unit (MMU). The MMU may be used to control access to a set of page tables stored in the memory. Other embodiments may be described and claimed.

9 Claims, 3 Drawing Sheets

PROCESSOR MULTI-PARTITION SECURITY ARCHITECTURE

TECHNICAL FIELD

Various embodiments described herein relate to digital circuitry generally, including apparatus, systems, and methods used to create, maintain, and switch between non-secure memory partitions using a processor.

BACKGROUND INFORMATION

A processor may be capable of exercising control over security features according to various security dimensions. One dimension may correspond to a mode of operation associated with a processor. The mode of operation may limit access to certain processor resources, including special-purpose registers. For example, some processors may execute in a user mode and in one or more privileged modes. An operating system (OS) may utilize the processor in a privileged mode. An application process, on the other hand, may operate in the user mode.

A processor may also execute a process in a secure mode or in a non-secure mode. A trusted software or firmware monitor may switch the processor to the secure mode. In the secure mode, the processor may gain additional levels of privilege necessary to execute trusted code and to access secure resources. Tasks such as authentication, signature manipulation, and secure transaction processing may be enabled thereby.

Some processors may utilize a memory management unit (MMU) to implement a secure set and a non-secure set of memory page tables. Using this structure, memory partitions and memory-mapped peripheral resources may be established as secure or non-secure based on a manipulation of the memory page tables by the processor. Secure processes may be able to access secure resources, and non-secure processes may be prohibited from accessing secure resources.

DETAILED DESCRIPTION

Figure 1:
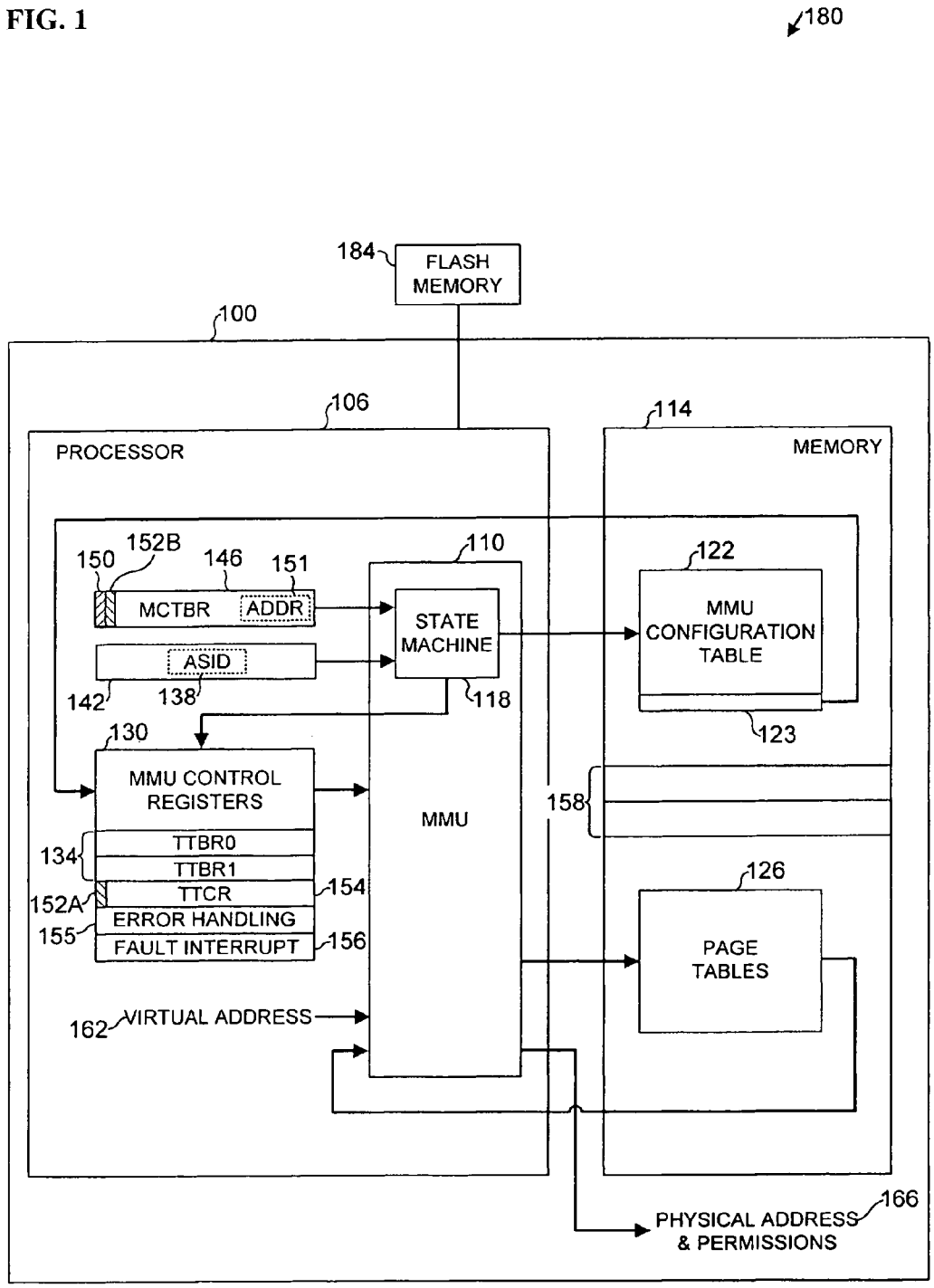
FIG. 1 is a block diagram of an apparatus and a representative system according to various embodiments of the invention.

FIG. 1 comprises a block diagram of an apparatus 100 and a system 180 according to various embodiments of the invention. Some embodiments may facilitate creating, maintaining, and switching between non-secure memory partitions using a processor 106. In one example, the processor 106 may, but need not, comprise a reduced instruction set processor. An architecture associated with the processor may optionally comprise a reduced instruction set computing (RISC) processor architecture. Some embodiments may restrict changes to contents of registers used to control virtual to physical memory mapping in an MMU 110. Access to a memory 114 by non-secure code may be controlled by code running in a secure mode. References herein to the memory 114 are generalized to mean one or more memory areas, whether or not contiguous, within one or more memory devices or banks of memory, and may include memory embedded in the processor 106.

A "secure code module" means a software and/or firmware module that is given access to and control of critical resources not accessible or controllable by a non-secure code module. A "secure area of memory" is an area of memory that a secure code module can access and modify. Generally speaking, a non-secure code module cannot access or modify a secure area of memory, whether by loads, stores or other instruction-driven memory access operations. An exception to the latter definition in some embodiments of the invention is that a state machine 118 may access an MMU configuration table (MMUCT) 122, even though the MMUCT 122 may be located in a secure area of the memory 114 and the processor 106 may be executing a non-secure code module. A further exception incorporated into some embodiments is that the MMU 110 may access a set of page tables 126, even though the page tables 126 may be located in a secure area of the memory 114 and the processor 106 may be executing a non-secure code module.

In some embodiments of the invention, modification of contents of one or more MMU control registers 130 by non-secure code may be prohibited. Control registers whose contents may be locked from modification by non-secure code may include a set of translation table base registers (TTBRs) 134, generally shown as TTBR0 and TTBR1. The TTBRs 134 may provide one or more base addresses to the MMU 110 to indicate a location of the page tables 126 in the memory 114. Although FIG. 1 depicts two TTBRs, the processor 106 may include additional or fewer TTBRs.

When a non-secure code module (e.g., a software application) requires memory paging services, a privileged non-secure code module (e.g., an OS) may write an address space identifier (ASID) 138 into a process ID register (PID) 142. The ASID 138 may correspond to the non-secure code module requiring the memory paging services. When the privileged non-secure code module modifies the PID 142, the state machine 118 may use the ASID 138 to index an entry 123 from the MMUCT 122. The entry 123 may comprise a set of values to load into the MMU control register(s) 130. The values loaded into the MMU control register(s) 130 may then be used to control memory paging operations associated with the MMU 110. Although FIG. 1 depicts one entry in the MMUCT 122, the MMUCT 122 may include additional entries.

Some embodiments of the invention may include an MMU configuration table base pointer register (MCTBR) 146. Access to the MCTBR 146 may be limited to periods of time when the processor 106 operates in a secure mode. The MCTBR 146 may contain an activation bit 150 to activate security methods utilizing embodiments disclosed herein. Upon activation, for example, non-secure code may be prohibited from disabling the MMU 110 or from locking entries into a translation look-aside buffer (not shown). The non-secure code may also be prohibited from changing a value in the page tables 126 if the page tables 126 are located in a secure area of the memory 114. The MCTBR 146 may also contain a base address 151 associated with a location of the MMUCT 122 in the memory 114.

Setting one or more bits 152A and/or 152B in the MMU control register(s) 130, in the MCTBR 146, or both, may force one or more of the page tables 126 to reside in a secure area of the memory 114. The bit(s) 152A and/or 152B may also configure the MMU 110 to generate a page translation error upon sensing an attempt by an application to access a page table located in a non-secure area of the memory 114. A non-secure code module may use but may not change the MMU control registers 130. The non-secure module may be prohibited from altering the page tables 126 if the page tables 126 are located in a secure area of the memory 114. Thus, even privileged code executing in a non-secure mode may be limited to accessing areas of the memory 114 to which a secure code module has granted access. In some embodiments, the secure code module may comprise a secure memory manager module.

Non-secure code may be prohibited from changing access permissions (e.g., read, write, and/or execute) granted by a secure code module. The secure code module may also control access to memory-mapped peripherals using the above-described process. Control over individual partitions of the memory 114 may thus be exercised, wherein an application executing in one partition may be prohibited from reading or modifying private data in another partition. Partitions accessible by two or more applications may also be created.

The apparatus 100 may thus include the state machine 118 located within the processor 106. The state machine 118 may be coupled to the MMUCT 122 stored in the memory 114. The memory 114 may, but need not, comprise a secure memory or a secure area of a memory. For example, some areas of the memory 114 may be secure and others non-secure. The state machine 118 may index the entry 123 from the MMUCT 122 and load the entry 123 into the MMU control register(s) 130.

The MMU control register(s) 130 may include the TTBRs 134 to store location information associated with the page tables 126, including perhaps base addresses associated with the page tables 126. The MMU control register(s) 130 may also include a translation table control register (TTCR) 154 to store one or more control values. The control value(s) may limit access by the MMU 110 to one or more partitions 158 within the memory 114. In some embodiments, the TTCR 154 may be adapted to cause the MMU 110 to generate an error, including perhaps a memory page translation error. The error may be generated when an application attempts to cause the MMU 110 to access a memory partition other than the partition(s) 158 within the memory 114. The MMU control register(s) 130 may further include an error-handling register 155, a register 156 to contain an interrupt vector (e.g., fault interrupt), or both. Although FIG. 1 depicts the error-handling register 155 and the fault interrupt register 156 as separate components, the error-handling register 155 and the fault interrupt register 156 may be integrated into a single component.

The apparatus 100 may also include the MMU 110 coupled to the MMU control register(s) 130 and to the memory 114. The MMU 110 may perform logical to physical address translation using the set of page tables 126 located in the memory 114. That is, a virtual address 162 input to the MMU 110 may result in a lookup in the page tables 126 of a physical address 166. The MMU 110 may be controlled using the parameters stored in the MMU control register(s) 130.

The MCTBR 146 may be coupled to the state machine 118 to provide a base address to locate the MMUCT 122 within the memory 114. The MCTBR 146 may also contain the enabling bit 150 to enable some security features in some embodiments of the invention, as previously described. The bits 152A and 152B in the TTCR 154 and in the MCTBR 146, respectively, may operate to force one or more of the page tables 126 to reside in a secure area within the memory 114. The bits 152A and 152B may also configure the system to generate an error upon an attempt by the MMU 110 to access a non-secure area within the memory 114.

The PID 142 may be coupled to the state machine 118 to notify the state machine 118 that the PID 142 has been modified and to supply an index value to be used by the state machine 118 to index the entry 123 from the MMUCT 122. The index value may comprise the ASID 138. For example, an 8-bit ASID might index 16 bytes of configuration data from the MMUCT 122. The MMUCT would occupy 4 kilobytes of memory in the latter example. The PID may comprise 32 bits. Some embodiments may use other sizes and configurations.

Any one or all of the MMU 110, the state machine 118, the MCTBR 146, and the PID 142 may be located within the processor 106 used to access the memory 114. The processor 106 may comprise a RISC processor.

In another embodiment, a system 180 may include one or more of the apparatus 100, as previously described. The system 180 may also include a memory 184 coupled to the processor 106. The memory 184 may comprise memory technologies including but not limited to flash memory, dynamic random access memory, and programmable read-only memory.

Any of the components previously described can be implemented in a number of ways, including embodiments in software. Thus, the apparatus 100; processor 106; MMU 110; memory 114; state machine 118; MMU configuration table (MMUCT) 122; entry 123; page tables 126; registers 130, 134, 142, 146, 154, 155, 156; address space identifier (ASID) 138; bits 150, 152A, 152B; base address 151; partitions 158; virtual address 162; physical address 166; system 180; and display 184 may all be characterized as "modules" herein.

The modules may include hardware circuitry, single or multi-processor circuits, memory circuits, software program modules and objects, firmware, and combinations thereof, as desired by the architect of the apparatus 100 and system 180 and as appropriate for particular implementations of various embodiments.

The apparatus and systems of various embodiments may be used in applications other than mechanisms for enabling a secure code module (e.g., a secure memory manager) to control access to memory partitions by non-secure code modules. Thus, various embodiments of the invention are not to be so limited. The illustrations of apparatus 100 and system 180 are intended to provide a general understanding of the structure of various embodiments. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may be included as sub-components within a variety of electronic systems, such as televisions, cellular telephones, personal computers (e.g., laptop computers, desktop computers, hand-held computers, tablet computers, etc.), workstations, radios, video players, audio players (e.g., mp3 players), vehicles, and others. Some embodiments may include a number of methods.

Figure 2:
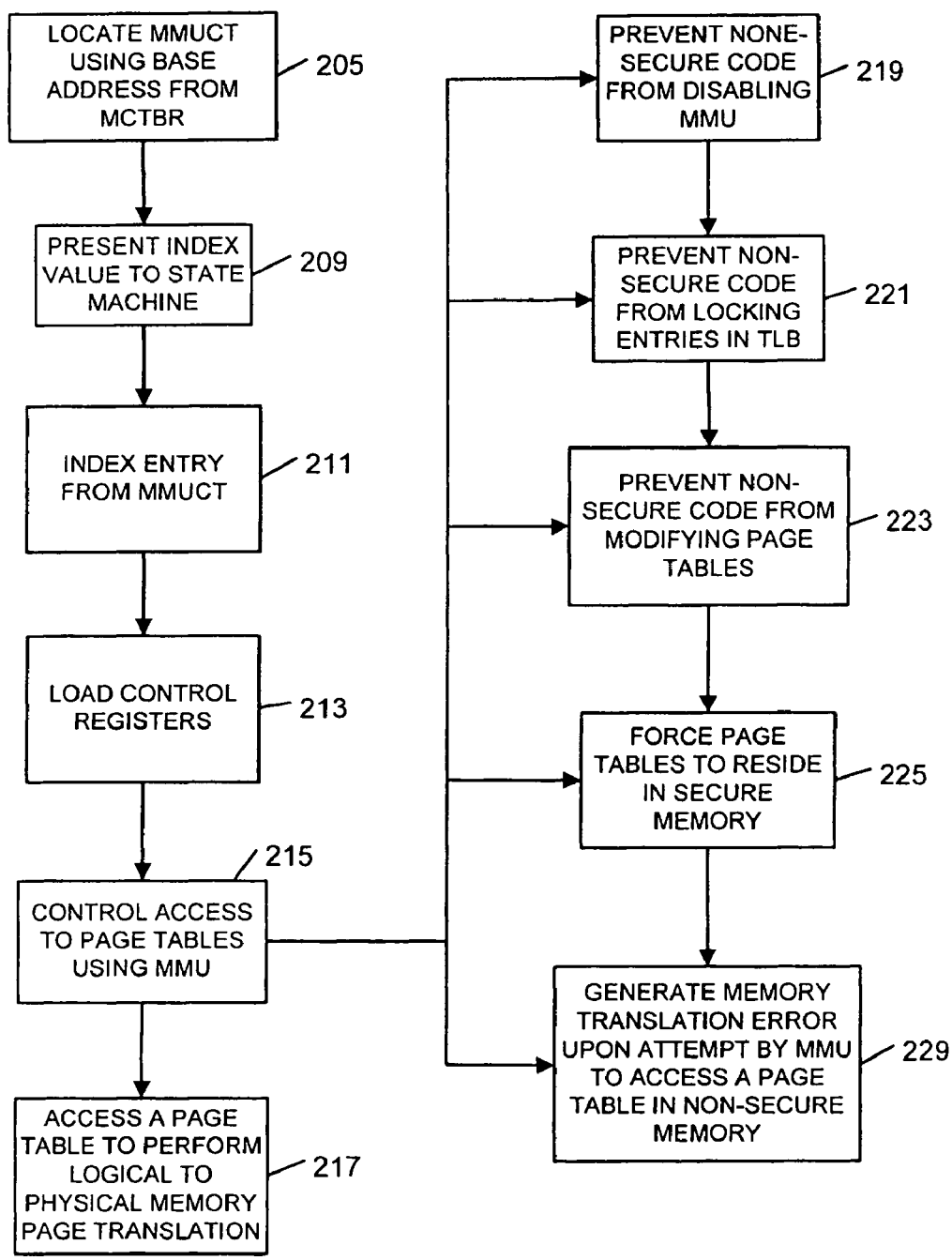
FIG. 2 is a flow diagram illustrating several methods according to various embodiments of the invention.

FIG. 2 is a flow diagram representation illustrating several methods according to various embodiments of the invention. A method 200 may begin at block 205 with locating an MMUCT within a memory. The MMUCT may be located using a base address contained in an MCTBR coupled to a state machine. Referring back to FIG. 1, the MMUCT 122 may be located within the memory 114 using the base address 151 contained in the MCTBR 146 coupled to the state machine 118. The state machine 118 may be located within the processor 106 used to enforce a memory security regimen.

The method 200 may include presenting an index value to the state machine, at block 209. The index value may comprise an ASID stored in a PID coupled to the state machine. The state machine may use the index value to index an entry from the MMUCT, at block 211. For example, the ASID 138 of FIG. 1 stored in the PID 142 may be used by the state machine 118 to index the entry 123 from the MMUCT 122. Mechanisms within the processor may notify the state machine that the PID has been modified. The notification may initiate enforcement of the memory security regimen.

The method 200 may also include loading one or more MMU control registers with the entry from the MMUCT, at block 213. The MMU control register(s) may comprise inputs to the MMU, and may include one or more TTBRs to store page table location information. The MMU control registers may also include a TTCR to store one or more control values. The one or more control values may operate to limit MMU access to one or more partitions within the memory. The MMU control registers may further include an error-handling register, a register to contain an interrupt vector, or both. For example, the MMU control registers 130 of FIG. 1 may include the TTBRs 134, the TTCR 154, the error-handing register 155, and the fault interrupt register 156, and may limit access by the MMU 110 to one or more partitions 158 within the memory 114.

The method 200 may thus include controlling access to a set of page tables stored in the memory, at block 215. The MMU, operating according to one or more parameters associated with the entry indexed from the MMUCT and stored in the MMU control registers, may exercise the page table access control. Subject to the page table access control, the method 200 may include accessing a page table using the MMU to translate a logical memory address to a physical memory address, at block 217.

One or more control bits in the MCTBR may also contribute to page table access control. The MCTBR control bit(s) may prevent a non-secure code module from disabling the MMU, at block 219. The MCTBR control bit(s) may prevent the non-secure code module from locking entries in a translation look-aside buffer, at block 221. The MCTBR control bit(s) may prevent the non-secure code module from modifying the set of page tables, at block 223. Some embodiments may utilize one or more control bits from the MCTBR, from a translation table control register coupled to the MMU, or from both to exercise page table access control via the MMU. The control bit(s) may operate to force the set of page tables to reside in a secure area of memory, at block 225. The control bit(s) may also generate a memory translation error upon an attempt by the MMU to access a page table in a non-secure area of memory, at block 229. From FIG. 1, for example, the bits 152A and 152B of the TTCR 154 and the MCTBR 146, respectively, may force the page tables 126 to reside in a secure area of the memory 114.

Activities described herein may be executed in an order other than the order described. And, various activities described with respect to the methods identified herein may be executed in repetitive, serial, or parallel fashion.

A software program may be instantiated or launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

Figure 3:
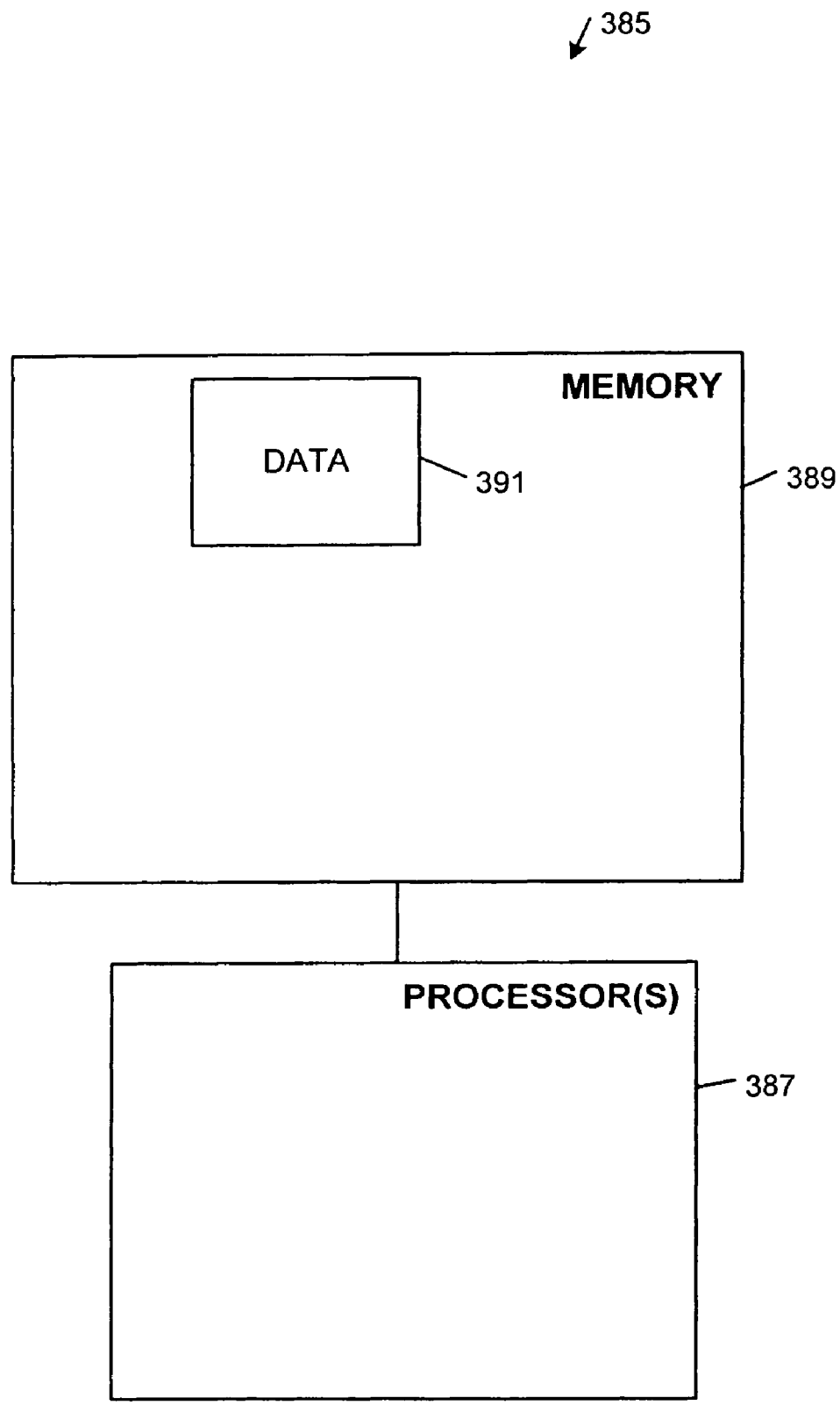
FIG. 3 is a block diagram of an article according to various embodiments of the invention.

FIG. 3 is a block diagram of an article 385 according to various embodiments of the invention. Examples of such embodiments may comprise a computer, a memory system, a magnetic or optical disk, some other storage device, or any type of electronic device or system. The article 385 may include one or more processor(s) 387 coupled to a machine-accessible medium such as a memory 389 (e.g., a memory including electrical, optical, or electromagnetic elements). The medium may contain associated information 391 (e.g., computer program instructions, data, or both) which, when accessed, results in a machine (e.g., the processor(s) 387) performing the activities previously described.

The apparatus, systems, and methods disclosed herein may implement a multi-partition architecture wherein isolated memory partitions are created, maintained, and switched between. Non-secure software tasks may run securely in the isolated memory partitions. Task-switching between the tasks executing in the different memory partitions may be accomplished with minimal overhead. Embodiments of the invention may prove useful in applications associated with electronic commerce and digital rights management, among others.

The inventive concept may include embodiments described in the exemplary context of an 802.xx implementation (e.g., Institute of Electrical and Electronic Engineers Standard 802.11 g, Standard for Information technology— Telecommunications and Information Exchange Between Systems—Local and Metropolitan Area Networks—Specific Requirements—Part 11: Wireless LAN Medium Access Control (MAC) and Physical Layer (PHY) Specifications-- Amendment 4: Further Higher Data Rate Extension in the 2.4 GHz Band (Jun. 2003); 802.11; 802.11a; 802.11n; 802.11 HT; 802.16; etc.). However, the claims are not so limited. Embodiments of the invention may be implemented as part of any wired or wireless system.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus, including:
   a state machine within a processor, the state machine coupled to a memory management unit configuration table (MMUCT) stored in a memory, the state machine to index an entry from the MMUCT and to load the entry into at least one memory management unit (MMU) control register; and
   an MMU configuration table base pointer register (MCTBR) coupled to the state machine to provide a base address to locate the MMUCT within the memory.

2. The apparatus of claim 1, further including at least one of:
   at least one bit associated with the MCTBR to activate at least one security feature associated with the apparatus, or
   at least one bit associated with at least one of the MCTBR or a translation table control register (TTCR) to force all page tables to reside in a secure area within the memory and to generate an error upon an attempt by the MMU to access a non-secure area within the memory.

3. A system, including:
   a state machine within a processor, the state machine coupled to a memory management unit configuration table (MMUCT) stored in a memory, the state machine to index an entry from the MMUCT and to load the entry into at least one memory management unit (MMU) control register;
   an MMU configuration table base pointer register (MCTBR) coupled to the state machine to provide a base address to locate the MMUCT within the memory;
   a process identification register (PID) coupled to the state machine to notify the state machine that the PID has been modified and to supply an index value to be used by the state machine to index the entry from the MMUCT; and
   a flash memory coupled to the processor.

4. The system of claim 3, wherein at least one of the MCTBR or the PID is located within the processor.

5. A method, including:
   locating a memory management unit configuration table (MMUCT) stored in a memory using a base address contained in an MMU configuration table base pointer register (MCTBR) coupled to a state machine;
   indexing an entry from the MMUCT using the state machine; and
   controlling access to a set of page tables stored in the memory using a memory management unit (MMU), wherein the MMU operates according to at least one parameter associated with the entry indexed from the MMUCT.

6. The method of claim 5, further including performing at least one of the following operations based on a setting of at least one control bit in the MCTBR:
   preventing a non-secure code module from disabling the MMU;
   preventing a non-secure code module from locking entries in a translation look-aside buffer; or
   preventing a non-secure code module from modifying the set of page tables.

7. The method of claim 5, further including performing at least one of the following operations based upon a setting of at least one control bit in at least one of the MCTBR or a translation table control register coupled to the MMU:
   forcing the set of page tables to reside in a secure area of the memory; and
   generating a memory translation error upon an attempt by the MMU to access a page table in a non-secure area of the memory.

8. An apparatus, including:
   a state machine within a processor, the state machine coupled to a memory management unit configuration table (MMUCT) stored in a memory, the state machine to index an entry from the MMUCT and to load the entry into at least one memory management unit (MMU) control register; and
   a process identification register (PID) coupled to the state machine to notify the state machine that the PID has been modified and to supply an index value to be used by the state machine to index the entry from the MMUCT.

9. The apparatus of claim 8, wherein the index value comprises an address space identifier (ASID).

* * * * *